Dec. 12, 1950 G. CHAUSSON 2,533,431
TANK FOR AIRPLANES AND SIMILAR APPLICATIONS
Filed Nov. 30, 1945 3 Sheets-Sheet 1

Inventor
Gaston Chausson

Dec. 12, 1950  G. CHAUSSON  2,533,431
TANK FOR AIRPLANES AND SIMILAR APPLICATIONS
Filed Nov. 30, 1945  3 Sheets-Sheet 2
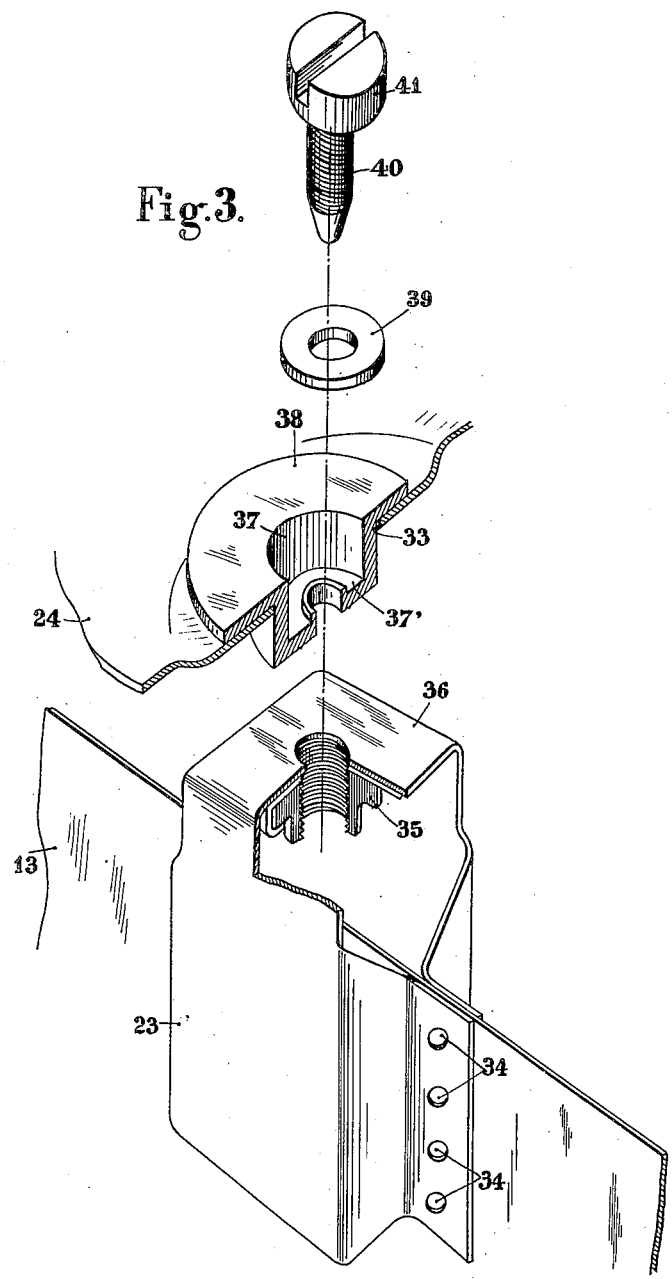
Inventor
Gaston Chausson
By
Atty

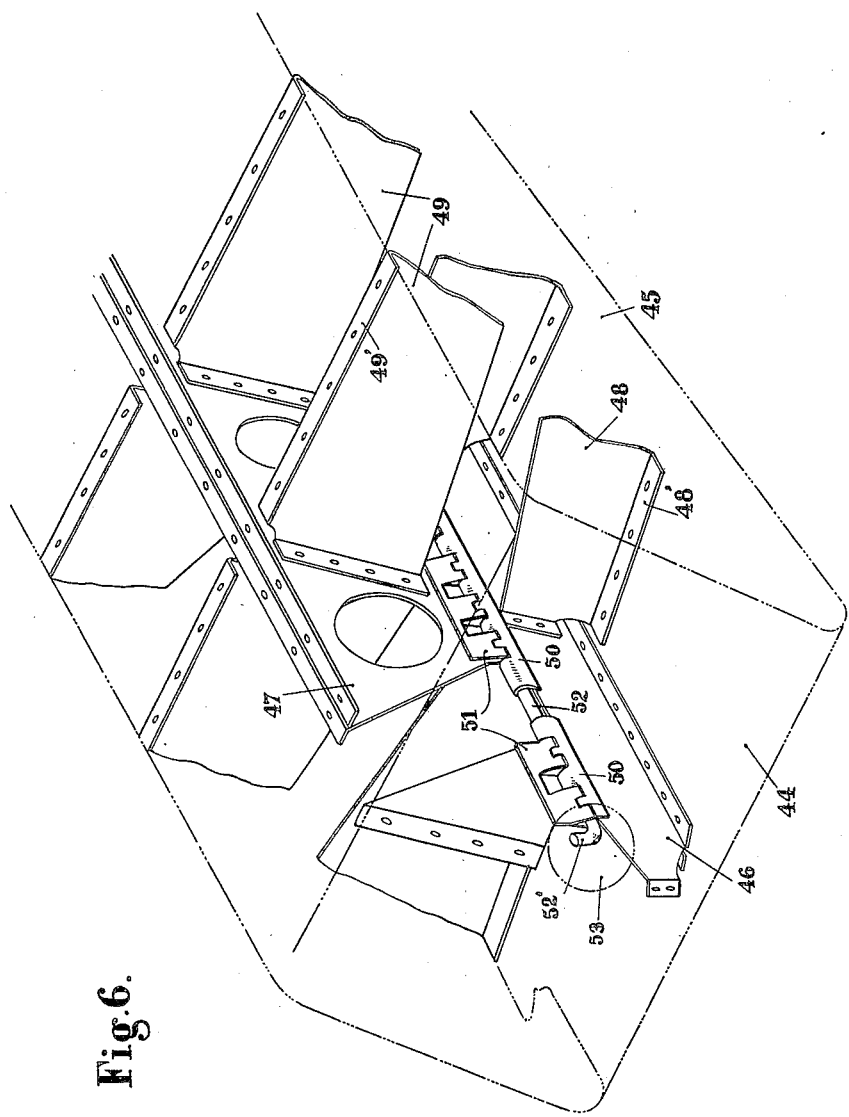

Patented Dec. 12, 1950

2,533,431

UNITED STATES PATENT OFFICE 2,533,431

TANK FOR AIRPLANES AND SIMILAR APPLICATIONS

Gaston Chausson, Asnieres, France, assignor to Societe Anonyme des Usines Chausson, Asnieres, France, a company of France Application November 30, 1945, Serial No. 631,894
In France November 7, 1944

Section 1, Public Law 690, August 8, 1946
Patent expires November 7, 1964

2 Claims. (Cl. 220—22)

This invention has for its primary object to provide a tank, such as a fuel tank for airplanes and other vehicles, which is very rigid and has great resistance to distortion whatever may be the general outer shape which must be given to to said tank, the available locations being taken into account. Said tank is moreover so devised that it can be easily and cheaply manufactured.

In accordance with the invention, the tank is constituted by two sections, a lower section and an upper section, each comprising a reinforcement in the form of stiffeners having a rational shape of profiled members for flexure stresses and of partitions placed transversely to said stiffeners, said stiffeners and partitions being secured to the respective sections and to each other. The two sections are assembled by external means after being superposed.

One of the sections, for instance the lower, comprises a bottom wall rigid with a continuous side wall structure capable of being suitably profiled.

The invention includes various other features and, in particular, special arrangements of the stiffeners and partitions, means for securing the latter to the sections, as well as methods for securing the two finished sections of the tank one on the other.

Further features and advantages of the invention will be gathered from the following specification and from the drawings, in which the invention is illustrated by way of example:

Fig. 3 is a detail perspective view, partly in section and partly broken away, showing separately the various members of one of the securing means which can be mounted indifferently on the upper section or on the lower section.

Fig. 6 is a partial perspective view showing a modification of the assemblage of the lower and upper sections of the tank.

Figure 1:
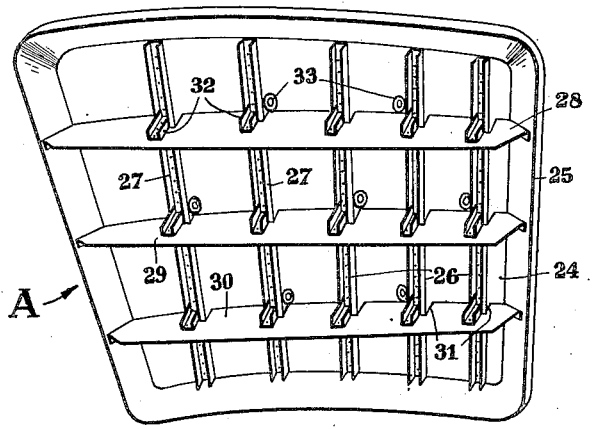
Fig. 1 is a perspective underside view of the upper section of the tank.
Figure 2:
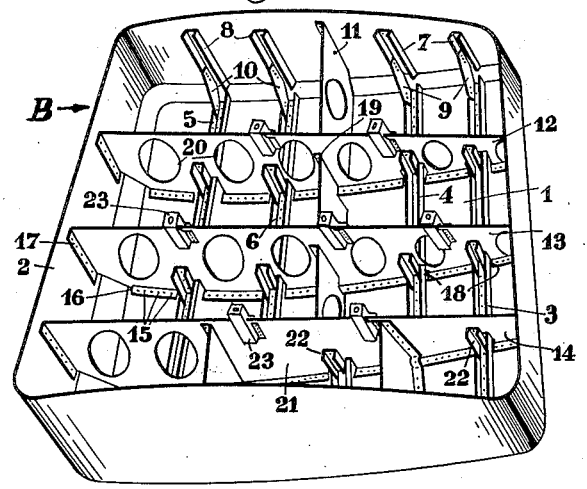
Fig. 2 is a perspective top view of the body comprising the lower section of the tank.

The tank is constituted by two sections A and B respectively illustrated in Figs. 1 and 2.

The lower section B illustrated in Fig. 2 comprises the bottom wall 1 having a continuous wall structure 2 forming the side and end walls of the section and which can be given the profile desirable or necessary for housing the tank in a constructional element, such as an airplane wing, for instance.

Channel shaped stiffeners 3, 4, 5, 6 are arranged from one end to the other of the sections of the tank and up the side walls as vertical stiffeners 7, 8, and angle members or gussets 9, 10 buttress the stiffeners 7, 8 against the stiffeners 3 to 6. The securing of the stiffeners on the bottom and on the side walls can be effected by means of electric spot welding.

A partition 11 is also arranged in the middle of the section between the pairs of stiffeners 3, 4 and 5, 6 and parallel thereto. It is secured to the bottom 1 by means of spot welding effected on a flanged edge of said partition.

Tranversely to stiffeners 3 to 6 and to partition 11, are arranged other partitions 12, 13, 14. In the same way as partition 11, partitions 12 to 14 are secured to the bottom 1 by spot welding 15 connecting flanged edges 16 of said partitions to said bottom wall and flanges 17 of said partitions are also secured by spot welding to opposite side walls 2. The longitudinal partition 11 is secured at one end to the transverse partition 14 by spot welding.

Partitions 12 to 14 are provided at the lower parts thereof, with recesses 18 by means of which they straddle the stiffeners 3 to 6. Moreover, openings 20 are formed in the partitions, both for lightening the structure and for facilitating the communication between the various compartments defined by said partitions.

Partition 14 comprises a solid portion 21 serving to delimit a substantially fluid tight compartment, such as usually utilised in aviation tanks.

Assembling members 22 are secured in the U-shaped stiffeners and on the lower part of the partitions for rendering the structure rigid.

Furthermore, assembling boxes 23, illustrated on an enlarged scale in Fig. 3, are placed on the upper free edges of the partitions.

The upper section A of the tank has a top wall 24 and a continuous downturned flange 25 adapted for connection with the top edge of wall 2 and is also provided with channel shaped stiffeners 26, 27, secured on the inner face of the top wall. Moreover, partitions 28, 29, 30 are secured to said top wall 24 and flange 25 transversely to the stiffeners 26, 27.

These partitions also have notches 31 allowing the passage of stiffeners 26, 27. Assembling members 32, similar to assembling members 22, provide connection between stiffeners 26, 27 and partitions 28, 30.

Holes 33 are provided in the top wall 24 for receiving the assembling members illustrated in Fig. 3.

According to the construction described, the tank is composed of two sections, a lower section and an upper section, constituting rigid strong tank sections, perfectly braced in every direction.

The assemblage of these two sections is extremely simple, since it suffices to superpose them, to effect the peripheral joint on their assembling edges, then to firmly secure them to each other, for instance by means of the device shown in Fig. 3.

When the upper section A of Fig. 1 is placed on the lower section B of Fig. 2, the partitions 28, 29, 30 of the upper section are placed at the side of partitions 12, 13, 14 of the lower element, slightly offset at the side of the latter. Holes 33 of the upper element are then placed exactly above the assembling devices 23 of the lower element.

Devices 23 are constituted, as shown in Fig. 3, by a sheet metal casing suitably folded and secured, for instance by spot welding 34, to partitions 12, 13, 14. An internally threaded member 35 is secured in the top 36 of said casings.

On the other hand, members 37, having the shape of a sleeve with a bearing flange 38, are secured in holes 33 of the upper section, sleeve 37 being intended to receive a washer 39 housed in the bottom 37' and a screw 40 with its head 41, said screw passing through the hole of washer 39 and that of sleeve 37 in order to screw into the internally threaded member 35 secured in the device 23 fixed to partition 13 of the lower element.

The arrangement given by way of example has been so devised that the securing means which connects the upper to the lower section does not project outside the contour of the tank, in order to facilitate the mounting of the latter in a chamber of minimum dimension, for instance in a wing; there are some cases in which a slight projection can be tolerated and, in this case, it will be understood that the flange 38 is flat, which simplifies the construction thereof; it is then possible to check the outer head of the nut by a pin, brass wire, braking plate or any suitable device; such an external checking is moreover possible when the screw head is embedded by means of special arrangements which are currently used in the art.

The flange 25 of the upper section A, can be fitted (Fig. 4) in the wall 2 of the lower section and be secured thereto by welding 42.

Figures 4, 5:
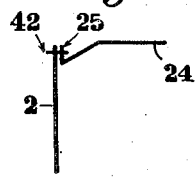
Figs. 4 and 5 are partial sections showing examples for assembling the upper and the lower sections.

As shown in the modification of Fig. 5, the upper section A might also be connected to wall 2 by an edge to edge welding assemblage 43.

According to Fig. 6, the lower section 44 of the tank rigid with a wall 45 carries partitions 46 and the upper section, not shown, carries partitions 47. Said partitions are so arranged as to be exactly superposed when assembling the lower on the upper section. Stiffeners 48 are arranged transversely to partitions 46 in the lower sections and stiffeners 49 are also arranged transversely to said partitions on the upper section. In the example illustrated, said stiffeners have the shape of plates secured to the respective sections by flanged edges 48', 49'. It is obvious that said stiffeners might have the shape of any angle members whatever.

Partitions 46 carry on the upper edge thereof, tubular hinge elements 50 which are for instance beaded at their edges, and partitions 47 also carry on their edges hinge elements 51 intended to engage in elements 50.

When the upper and lower sections of the tank are assembled, partitions 47 are placed above partitions 46, and hinge elements 51 fit in hinge elements 50 forming a continuous slide-way through which is passed a hinge pin 52. For that purpose, a hole 53 is provided in the wall at the end of the tank and pin 52 is threaded in the hinge elements by pushing its curved end 52'. When the assemblage is completed, hole 53 is filled up by welding thereon a suitable pellet.

Various modifications can moreover be made in the embodiments illustrated by way of examples.

Thus, the assembling device of Fig. 3 might be replaced by simple rods secured to the partitions of the lower element, then passed through holes of the upper bottom and riveted or welded above the latter, if need be, on a reinforcing member placed in said holes.

On the other hand, the number and arrangement of the stiffeners and transverse partitions relatively to said stiffeners or parallel thereto can vary. The partitions can also comprise openings different from those illustrated.

The tank in accordance with the invention can obviously be manufactured from any suitable material.

It is particularly to be noted that the construction according to the invention provides tanks having the desired shape and profile, and ensures rigidity of all the parts of said tanks, whatever may be their profile. This constitutes a particularly important advantage in aeronautical construction in which tanks are housed in all sorts of available spaces, in particular in the wings, and must consequently have parts of small dimensions.

Furthermore, the construction, in accordance with the invention, made of two separate elements intended to be assembled when completed, allows ready manufacture on the machine-tools currently available; in particular, all the spot weldings serving to secure the stiffeners and partitions to the walls can be effected by means of ordinary welding machines. This construction therefore also offers great advantages as regards manufacture.

What I claim and desire to secure by Letters Patent of the United States is:

1. A tank for airplanes and other vehicles comprising a pair of complementary dished sections adapted to be fitted one upon the other to form a closed tank assembly, a plurality of parallel partition forming plates fixed in each of said sections to substantially overlie each other respectively to cooperatively form substantially continuous partitions when said sections are assembled, openings in said partitions to permit communication between the areas on the opposite sides of said partitions, a plurality of stiffening elements fixed to each section and extending transversely of said partitions and through said opennigs, and means for connecting said sections in a rigid assembly and to provide a fluid-tight joint therebetween, said connecting means comprising interfitting hinge elements fixed on the partitions of the respective sections, and a pin slidably fitted through said hinge elements.

2. A tank for airplanes and other vehicles comprising a pair of complementary dished sections adapted to be fitted one upon the other to form a closed tank assembly, a plurality of parallel partition forming plates fixed in each of said sections to substantially overlie each other respectively to cooperatively form substantially continuous partitions when said sections are assembled, openings in said partitions to permit communication between the areas on the opposite sides of said partitions, a plurality of stiffening elements fixed to each section and extending transversely of said partitions and through said openings, and means for connecting said sections in a rigid assembly and to provide a fluid-tight joint therebetween, the partition plates of the two sections being slightly offset relative to each other when assembled, said connecting means including a plurality of box-like members secured to the free edge portions of the partition plates of one of said sections to be positioned beside the corresponding partition plates of the other section, a threaded nut supported by each of said box-like elements, a plurality of sleeves fixed to and extending inwardly of said other section to respectively register with said threaded nuts, and a bolt insertable through each of said sleeves for cooperation with the respective nut to retain said sections in registry and form a fluid-tight tank.

GASTON CHAUSSON.

REFERENCES CITED

The following references are of record in the file of this patent:

UNITED STATES PATENTS

| Number | Name | Date |
|---|---|---|
| 930,334 | Augustus | Aug. 10, 1909 |
| 1,788,408 | Raybould | Jan. 13, 1931 |
| 1,862,819 | Danielson | June 14, 1932 |
| 2,262,606 | Hardman | Nov. 11, 1941 |
| 2,316,116 | Thompson et al. | Apr. 6, 1943 |
| 2,408,386 | Furry | Oct. 1, 1946 |

FOREIGN PATENTS

| Number | Country | Date |
|---|---|---|
| 223,660 | Great Britain | Oct. 27, 1924 |
| 544,281 | Great Britain | Apr. 7, 1942 |
| 552,057 | Great Britain | Mar. 22, 1943 |